United States Patent
Kano (10) Patent No.: US 10,235,742 B2
(45) Date of Patent: Mar. 19, 2019

(54) IMAGE PROCESSING APPARATUS, IMAGE CAPTURING APPARATUS, IMAGE PROCESSING METHOD, AND NON-TRANSITORY COMPUTER-READABLE STORAGE MEDIUM FOR ADJUSTMENT OF INTENSITY OF EDGE SIGNAL

(71) Applicant: CANON KABUSHIKI KAISHA, Tokyo (JP)

(72) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 15/078,161

(22) Filed: Mar. 23, 2016

(65) Prior Publication Data

US 2016/0284061 A1   Sep. 29, 2016

(30) Foreign Application Priority Data

Mar. 26, 2015   (JP) ................................ 2015-064900

(51) Int. Cl.
*G06T 5/00*   (2006.01)

(52) U.S. Cl.
CPC .............. *G06T 5/003* (2013.01); *G06T 5/006* (2013.01); *G06T 2207/20192* (2013.01)

(58) Field of Classification Search
USPC .......... 1/1; 348/223.1, 224.1, 241, 242, 243; 382/167, 275
See application file for complete search history.

(56) References Cited

U.S. PATENT DOCUMENTS 6,449,060 B1 *  9/2002  Kawai ................ H04N 1/40012
                                                            358/1.9
7,061,647 B2 *  6/2006  Matsuya .................. H04N 1/56
                                                            358/1.9

(Continued)

FOREIGN PATENT DOCUMENTS

CN          1774030 A      5/2006
CN        102833461 A     12/2012

(Continued)

OTHER PUBLICATIONS

The above documents were cited in a Jun. 5, 2018 Chinese Office Action, which is enclosed with an English Translation, that issued in Chinese Patent Application No. 201610181370.9.

*Primary Examiner* — Xuemei G Chen (74) *Attorney, Agent, or Firm* — Cowen, Liebowitz & Latman, P.C.

(57) ABSTRACT

An image processing apparatus which performs recovery processing that corrects aberration of an imaging optical system used when generating the image and recover image quality degradation, determines an adjustment value for adjusting a degree of emphasis of an edge included in an image, and performs edge emphasis processing by detecting an edge signal from the image, adjusting intensity of the detected edge signal based on the determined adjustment value, and adding the edge signal after adjustment to the image, wherein the adjustment value is determined based on whether the recovery processing has been performed for an image where the edge signal is detected, and with the adjustment value in a case where the recovery processing has been performed, degree of emphasis is suppressed compared to the adjustment value in a case where the recovery processing has not been performed.

15 Claims, 8 Drawing Sheets

(56) References Cited

U.S. PATENT DOCUMENTS

| | | | |
|---|---|---|---|
| 7,130,483 B2 * | 10/2006 | Kim | G06T 5/004 382/266 |
| 7,190,395 B2 | 3/2007 | Nakano | |
| 8,542,920 B2 * | 9/2013 | Kano | G06T 5/006 382/167 |
| 8,576,310 B2 * | 11/2013 | Tatsuzawa | H04N 5/225 348/243 |
| 8,588,521 B2 * | 11/2013 | Kano | H04N 9/045 382/167 |
| 8,971,622 B2 * | 3/2015 | Kano | H04N 9/045 348/242 |
| 9,167,216 B2 * | 10/2015 | Kano | H04N 9/045 |
| 9,349,161 B2 * | 5/2016 | Tamura | G06T 5/003 |
| 9,843,703 B2 * | 12/2017 | Uchihara | H04N 1/4092 |
| 2006/0104538 A1 * | 5/2006 | Izumi | G06T 5/002 382/275 |
| 2012/0154626 A1 * | 6/2012 | Hatakeyama | H04N 9/045 348/223.1 |
| 2012/0320240 A1 * | 12/2012 | Kano | H04N 5/3572 348/241 |
| 2013/0076938 A1 * | 3/2013 | Kano | H04N 1/409 348/224.1 |
| 2017/0004606 A1 * | 1/2017 | Naruse | H04N 1/4092 |

FOREIGN PATENT DOCUMENTS

| | | |
|---|---|---|
| CN | 102970547 A | 3/2013 |
| CN | 104427321 A | 3/2015 |
| JP | 2006-238032 A | 9/2006 |

* cited by examiner

EDGE CROSS-SECTION

EDGE SIGNAL

BEFORE RECOVERY PROCESSING

AFTER RECOVERY PROCESSING

AFTER DEVELOPMENT PROCESSING

IMAGE PROCESSING APPARATUS, IMAGE CAPTURING APPARATUS, IMAGE PROCESSING METHOD, AND NON-TRANSITORY COMPUTER-READABLE STORAGE MEDIUM FOR ADJUSTMENT OF INTENSITY OF EDGE SIGNAL

BACKGROUND OF THE INVENTION

Field of the Invention

The present invention relates to an image processing apparatus, an image capturing apparatus, an image processing method, and a non-transitory computer-readable storage medium.

Description of the Related Art

Along with the digitization of information, there have been proposals for various methods of correction processing performed on a shot image by handling the image as signal values. When capturing a subject with a digital camera and converting the subject to an image, the obtained image is considerably degraded particularly by aberration of an imaging optical system.

A blur component of an image is caused by spherical aberration, comatic aberration, image plane curvature, astigmatic aberration, and the like of the optical system. The blur component of the image due to these forms of aberration indicates that an image is formed in which, although luminous flux emitted from one point of the subject should be again gathered at one point on the imaging plane in a case where the image is aplanatic and there is no effect of diffraction, this luminous flux has a spread. Optically, this is called a point spread function (PSF), and is referred to as the blur component in an image. Image blur, for example, also refers to an image that is out of focus, but here, image blur can refer to blurring due to the effect of aberration in the above optical system even if the image is in focus. Also, color bleeding in a color image that is caused by color aberration on the axis of the optical system, color spherical aberration, and color comatic aberration, can also refer to differences in blurring between each wavelength of light. Also, color shift in the lateral direction caused by magnification color aberration of the optical system can refer to positional shift or phase shift due to differences in capture magnification between each wavelength of light.

An optical transfer function (OTF) obtained by performing a Fourier transform on the PSF is frequency component information of aberration, and is expressed as a complex number. The absolute value of the OTF, i.e., an amplitude component, is referred to as a Modulation Transfer Function (MTF), and a phase component is referred to as a PTF (Phase Transfer Function). Thus, the MTF and the PTF respectively are frequency characteristics of the amplitude component and the phase component of image degradation due to aberration. Here, the phase component is expressed as a phase angle in the below expression. Re(OTF) and Im(OTF) respectively indicate a real portion and an imaginary portion of the OTF.

$$PTF = \tan^{-1}(Im(OTF)/Re(OTF)) \quad (Exp. 1)$$

Thus, the OTF of the imaging optical system contributes degradation to the amplitude component and the phase component of the image, so in the degraded image, points of the subject are in an asymmetrically blurred state with comatic aberration. As a method for correcting degradation of amplitude (MTF) and degradation of phase (PTF), it is known to perform correction using information of the OTF of the imaging optical system. This method is referred to by the terms image recovery or image restoration, and hereinafter, processing to correct image degradation using information of the OTF of the imaging optical system is referred to as image recovery processing or recovery processing.

Following is a summary of image recovery processing. In the expression below, g(x, y) represents a degraded image, f(x, y) represents an original image, and h(x, y) represents a PSF obtained by performing an inverse Fourier transform on the above optical transfer function. Note also that * indicates convolution, and (x, y) indicates coordinates on an image.

$$g(x,y) = h(x,y) * f(x,y) \quad (Exp. 2)$$

Also, when a Fourier transform is performed on this expression to convert to a format for display in the frequency plane, a format is obtained that is a product of each frequency, as in the below expression. H is obtained by performing a Fourier transform on the PSF, and therefore is an OTF. Coordinates in a two-dimensional frequency plane are indicated by (u, v), that is, (u, v) indicates frequency.

$$G(u,v) = H(u,v) \cdot F(u,v) \quad (Exp. 3)$$

In order to obtain an original image from a degraded image that has been shot, both sides may be divided by H as shown below.

$$G(u,v)/H(u,v) = F(u,v) \quad (Exp. 4)$$

By performing an inverse Fourier transform on this F(u, v) to return to an actual plane, an original image f(x, y) is obtained as a recovered image.

Here, if R represents the result obtained by performing an inverse Fourier transform on 1/H in the above expression, it is similarly possible to obtain an original image by performing convolution processing on an image in the actual plane as shown in the below expression.

$$g(x,y) * R(x,y) = f(x,y) \quad (Exp. 5)$$

This R(x, y) is called an image recovery filter. Because there is a noise component in the actual image, when an image recovery filter created with a perfect reciprocal of the OTF as described above is used, the noise component is amplified together with the degraded image so usually a good image is not obtained. In this regard, a method is known in which, for example as with a Wiener filter, the recovery rate of the high frequency side of the image is suppressed according to an intensity ratio of the image signal and the noise signal. As a method for correcting degradation of a color bleeding component of the image, for example, correction is considered performed when there is a uniform amount of blur for each color component of the image by the above blur component correction. Here, because the OTF varies according to shooting states such as a zoom position state or the state of an aperture diameter, it is necessary that the image recovery filter used in image recovery processing also varies according to the shooting state.

Research into this sort of image recovery technology has previously been performed, and in Japanese Patent Laid-Open No. 2006-238032, image recovery processing is disclosed in which image recovery processing is performed with a minutely small spread being set for the PSF after image recovery.

As described above, image quality can be improved by correcting aberration by performing image recovery processing on an input image that was captured. Due to the image recovery correcting lens aberration, perceived resolution of the image improves, but edge emphasis is widely known as other processing that improves perceived resolution. Edge emphasis is processing that emphasizes outlines of an image, thus improving the perceived resolution of the image.

Perceived resolution can be improved by edge emphasis, but there are cases where over-correction in image recovery is emphasized. Also, there are cases where a user can set the intensity of a sharpness function of a digital camera utilizing edge emphasis processing, but operability of the camera is considerably decreased when settings values are adjusted according to whether or not image recovery is applied. With regard to this point, above-described Japanese Patent Laid-Open No. 2006-238032 does not consider edge emphasis processing when performing image recovery.

SUMMARY OF THE INVENTION

The present invention provides technology that enables edge emphasis processing in which effects of over-correction due to image recovery are suppressed.

One embodiment of the invention relates to an image processing apparatus, comprising a recovery processing unit configured to, for an image subject to processing, perform recovery processing that corrects aberration of an imaging optical system used when generating the image and recover image quality degradation, a determination unit configured to determine an adjustment value for adjusting a degree of emphasis of an edge included in the image subject to processing, and an edge emphasis unit configured to perform edge emphasis processing by detecting an edge signal from the image subject to processing, adjusting intensity of the detected edge signal based on the determined adjustment value, and adding the edge signal after adjustment to the image subject to processing, wherein the determination unit determines the adjustment value based on whether or not the recovery processing has been performed for an image where the edge emphasis unit detects the edge signal, and with the adjustment value in a case where the recovery processing has been performed, degree of emphasis is suppressed compared to the adjustment value in a case where the recovery processing has not been performed.

Further features of the present invention will become apparent from the following description of exemplary embodiments (with reference to the attached drawings).

DESCRIPTION OF THE EMBODIMENTS

Following is a description of an embodiment of the invention with reference to the attached drawings. First, effects on edge emphasis of over-correction in image recovery processing, investigated in the present embodiment, will be described in more detail with reference to FIGS. 8A to 8D.

As described above in the Background of the Invention, by performing image recovery processing on an input image that was captured, and recovering image quality degradation by correcting aberration, image quality can be improved. However, in actual capturing, there are cases where the capture state of the input image does not optimally match the state of an image recovery filter for recovering the input image. As examples, there are cases where there are saturated pixels in the shot image, and cases where there are effects due to manufacturing differences of the lens. In the saturated pixels, the original subject information has been lost, so a circumstance occurs in which the state of the input image is not the same as the state of the degraded image on which the image recovery filter is to be applied. Also, when there are manufacturing differences in the lens, optical performance differs between individual lenses, so a circumstance occurs in which characteristics differ between the degraded image on which the image recovery filter is to be applied and the shot image.

In the image recovery processing, a filter for compensating for frequency characteristics is applied, so when frequency characteristics of the image differ from frequency characteristics intended to be corrected with the filter, there are cases where the image is harmed by over-correction such as ringing or undershooting. Due to the loss of subject information due to saturation, a saturation area in the shot image has frequency characteristics that differ greatly from frequency characteristics originally expressed by the subject. In particular, frequency characteristics in an area near a boundary between a saturated pixel and an unsaturated pixel greatly differ from frequency characteristics on which the image recovery filter is to be applied, so over-correction easily occurs in this area.

Figure 8A:
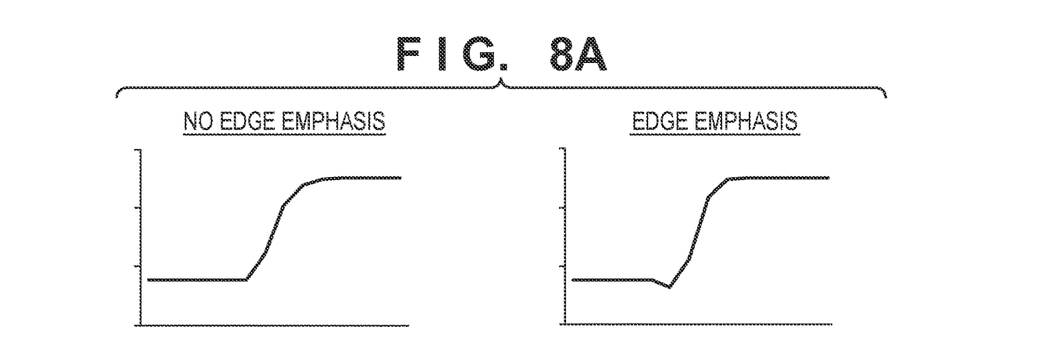
FIGS. 8A to 8D illustrate edge cross-sections due to edge emphasis processing, and edge cross-sections when performing image recovery.

Image recovery improves the perceived resolution of an image by correcting aberration of the lens, but edge emphasis is widely known as other processing that improves perceived resolution. Edge emphasis is processing that improves perceived resolution of an image by emphasizing outlines of the image. FIG. 8A shows an example of edges emphasized with edge emphasis processing. FIG. 8A shows a graph of luminance of a cross-section of an edge. This graph indicates that when edge emphasis processing is performed, the slope of the edge becomes sudden, so the perceived resolution of the image is improved. In edge emphasis, there are cases where components not present in the shot image of the original subject, such as undershooting or overshooting, are caused to occur in order to improve perceived resolution when viewing the image. Recent digital cameras also have this sort of edge emphasis as a sharpness function, and edge emphasis is commonly performed within a camera based on an intensity settable by a user.

Edge emphasis is effective processing for adjusting perceived resolution according to viewing size or application of a photograph, even in an image in which aberration has been corrected by applying image recovery.

Figure 8B:
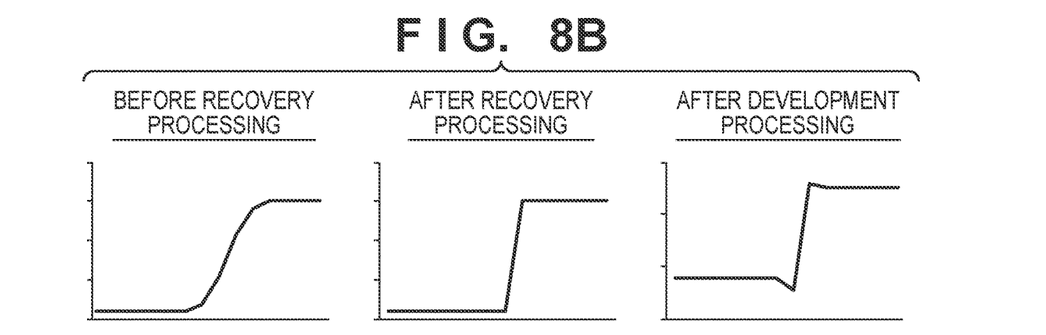
Figure 8C:
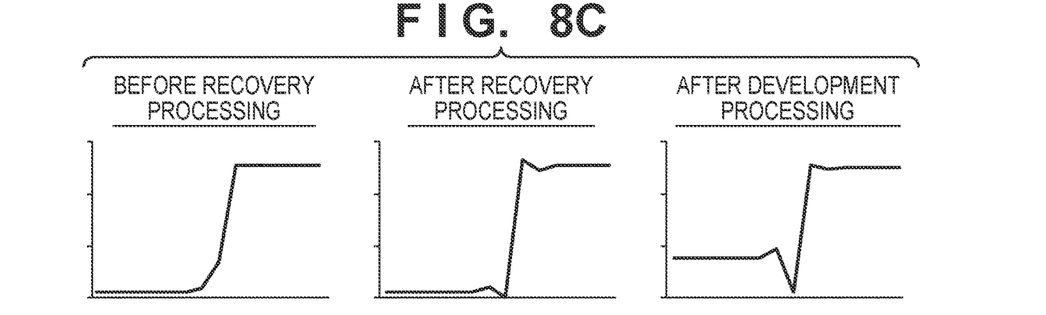
Figure 8D:
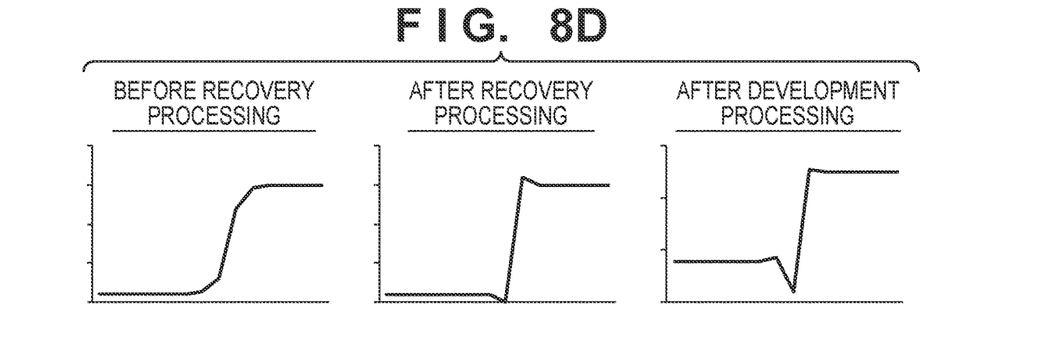

However, as described above, in image recovery, there are cases where ringing, undershooting, or the like occur due to over-correction. There are cases where effects due to over-correction in image recovery are also emphasized when edge emphasis is applied to such an image. FIGS. 8B to 8D show adaptation of image recovery, and edges of an image after image processing such as gamma correction and edge emphasis was performed. FIG. 8B shows an example in which appropriate image recovery processing was performed, without over-correction. This example shows a developed image in which an edge that was blurred as an effect of aberration was corrected by image recovery, and further, image processing such as gamma correction and edge emphasis was performed. FIG. 8C shows an example in which a high-luminance portion of an edge is saturated. In this case, in image recovery, appropriate correction is not performed and ringing occurs. In this example, this ringing is emphasized after development. FIG. 8D shows an example in which an image prior to recovery processing that is a degraded image due to manufacturing differences differs from the original image (the image prior to recovery processing in FIG. 8B). In this example as well, in image recovery, appropriate correction is not performed, and so over-correction is emphasized after development processing.

In the same PSF blur component as well, contribution to pixel values of the aberration component is greater at an edge with greater contrast, so aberration is apparent. Accordingly, the change in pixel values due to image recovery is greater at an edge with greater contrast. That is, there is a greater effect when over-correction occurs in image recovery at an edge with greater contrast, so this effect is apparent in the image. Within an edge with large contrast, inevitably a low-luminance side of the edge has small pixel values within the luminance range, and conversely a high-luminance side of the edge is saturated or has large pixel values within the luminance range. Due to gamma correction of the image capturing apparatus, this high-luminance portion often concludes at the maximum pixel value in a final image. Accordingly, it can be said that the effect on an image of over-correction in image recovery is most easily apparent on a low-luminance side of an edge.

Thus, edge emphasis is effective for improving perceived resolution, but there are cases where the result of over-correction in image recovery also is emphasized. In the embodiments described below, technology is described that enables edge emphasis processing to be implemented without emphasizing over-correction due to image recovery.

First Embodiment

Figure 1:
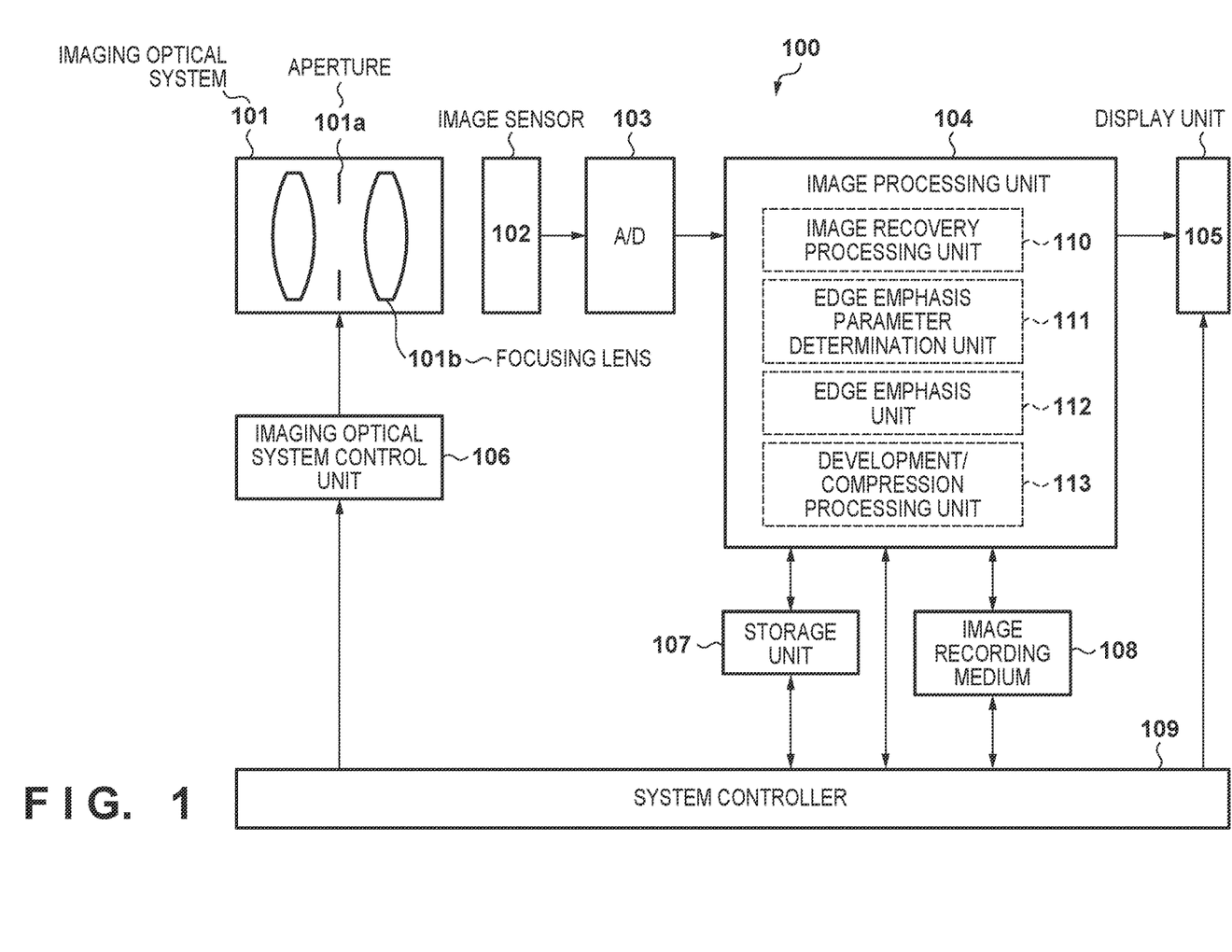
FIG. 1 shows an exemplary configuration of an image processing apparatus according to an embodiment of the invention.

First, a first embodiment of the invention will be described. FIG. 1 shows an example of the basic configuration of an image processing apparatus 100 according to an embodiment of the invention. The image processing apparatus 100 can be realized as an image capturing apparatus such as a digital camera. Otherwise, an arbitrary information processing terminal or image capturing apparatus, such as a personal computer, a mobile telephone, a smartphone, a PDA, a tablet terminal, or a digital video camera, for example, can be adopted as the image processing apparatus 100.

Below, while describing operation of the image processing apparatus 100, constituent elements and their functions of the image processing apparatus 100 will be described. In order to generate an image of a subject, reflected light from the subject is caused to form an image on an image sensor 102 with an imaging optical system 101. Mechanical driving of the imaging optical system 101 is performed with an imaging optical system control unit 106 according to instructions of a system controller 109. An opening diameter of an aperture 101a is controlled as a shooting state setting of an F-number. A focusing lens 101b controls the position of a lens using an un-shown autofocus (AF) mechanism or manual focus mechanism in order to adjust focus according to a subject distance. This imaging optical system may also include optical elements such as a low-pass filter or a UV-cutting filter, but if an element is used that affects OTF characteristics such as a low-pass filter, effects of the element may need to be considered when creating an image recovery filter. Also, a UV-cutting filter affects the PSF of respective RGB channels, which are summed values of the spectrum wavelength PSF, and particularly affects the PSF of the R channel, so effects of the UV-cutting filter may need to be considered when creating the image recovery filter.

The image sensor 102 converts formed image light that was obtained by the imaging optical system 101 to an electrical signal, and outputs an analog image signal to an A/D converter 103. The A/D converter 103 converts the analog image signal that was input to a digital image signal, and outputs the digital image signal to an image processing unit 104. The image processing unit 104 performs predetermined image processing on the digital image signal that was input. The image processing unit 104 corresponding to the present embodiment includes an image recovery processing unit 110, an edge emphasis parameter determination unit 111, an edge emphasis unit 112, and a development/compression processing unit 113. A sequence of processing in the image processing unit 104 is controlled with the system controller 109.

Detailed processing of the image processing unit 104 will be described later, but recovery filter application processing for image recovery is performed in the image recovery processing unit 110. In the edge emphasis parameter determination unit 111, edge emphasis parameters are determined according to capture settings, and in the edge emphasis unit 112, edge emphasis processing is applied according to the edge emphasis parameters that were determined. In the development/compression processing unit 113, predetermined image processing is performed, such as pixel interpolation, gamma correction, color balance adjustment, and compression processing. With the processing in each of the blocks 110 to 113, the image processing unit 104 can generate an image file such as a JPEG image.

The system controller 109 saves an output image that is the JPEG image or the like that was obtained from the image processing unit 104 to an image recording medium 108 in a predetermined format. Also, after image recovery processing is performed on an image, predetermined processing for display is performed on the image and then the image is displayed in a display unit 105. An image may also be displayed that has not undergone image recovery processing, or that has undergone simple recovery processing.

Above was a description of the basic configuration and operation of the image processing apparatus 100 according to an embodiment of the invention. In FIG. 1, the imaging optical system 101 is shown as one constituent element of the image processing apparatus 100, but a configuration may also be adopted in which the imaging optical system 101 can be removed from the main body of the image processing apparatus 100, as in the case of a single lens reflex camera.

In the image processing apparatus 100 in FIG. 1, except for physical devices such as the imaging optical system, the image sensor, and display elements, each block may be configured in hardware using dedicated logic circuits or memories. Alternatively, such blocks may be configured in software by a computer such as a CPU executing processing programs stored in a memory.

Figure 2:
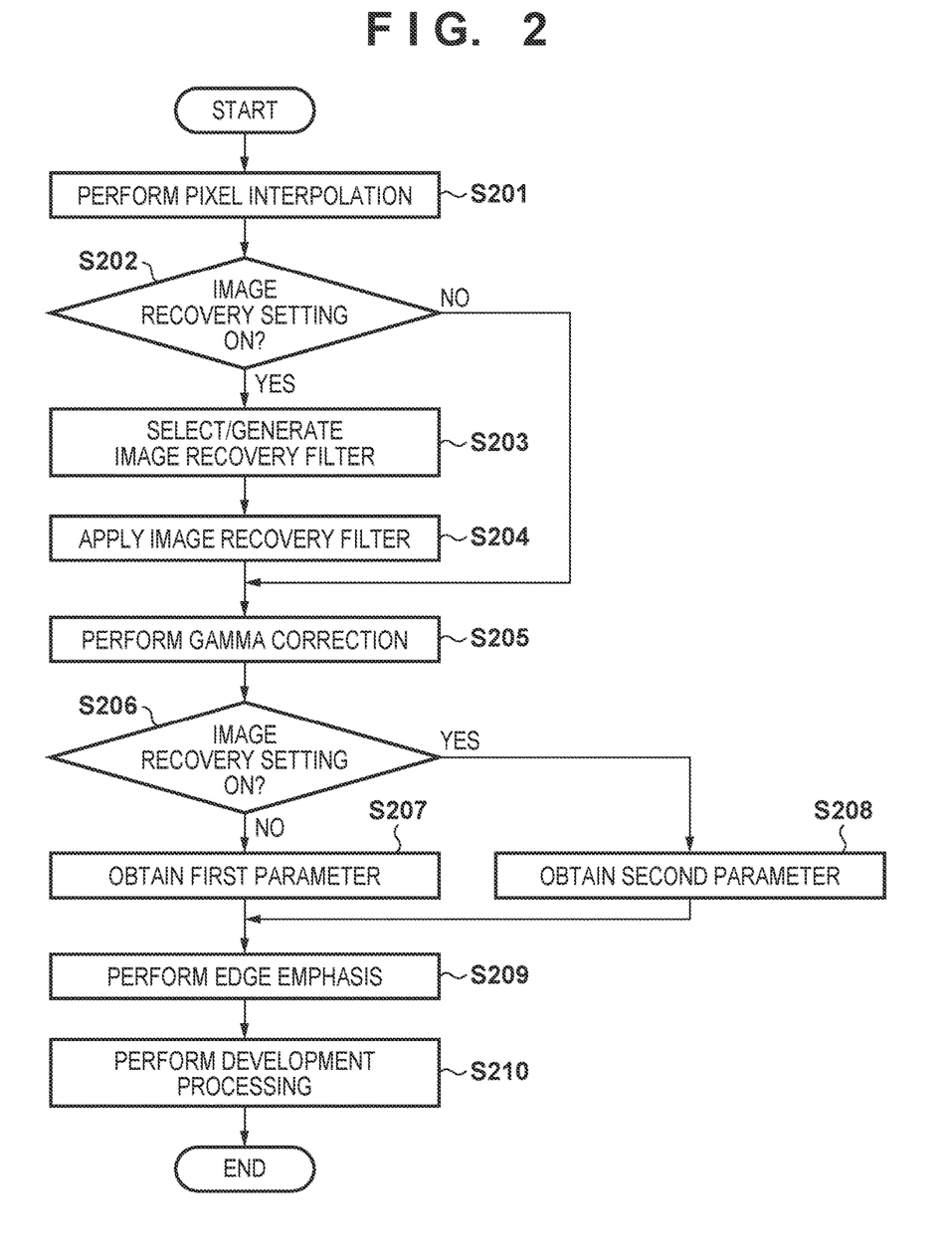
FIG. 2 is a flowchart that shows an example of image processing according to an embodiment of the invention.

Next is a detailed description of image processing corresponding to the present embodiment executed by the image processing unit 104, with reference to the flowchart in FIG. 2. The processing corresponding to this flowchart, for example, can be realized by executing a program (stored in a ROM or the like) supported by at least one processor that functions as the image processing unit 104.

Figure 3A:
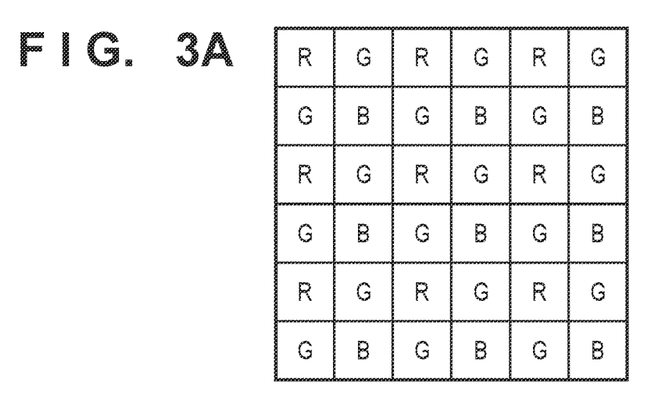
FIG. 3A illustrates a RAW image according to an embodiment of the invention.

The input to the image processing unit 104 is a RAW image in Bayer format having a color component of one color in each pixel, as shown in FIG. 3A. First, in step S201, the development/compression processing unit 113 creates three color planes of RGB by performing pixel interpolation processing for each color component of the RAW image. Next, in step S202, the image recovery processing unit 110 determines whether or not an image recovery application setting, settable by a user, is set to ON. If determined that the image recovery application setting is set to ON ('YES' in step S202), processing moves to step S203. On the other hand, if determined that the image recovery application setting is set to OFF ('NO' in step S202), processing moves to step S205.

In step S203, the image recovery processing unit 110 selects an image recovery filter suitable for shooting conditions such as zoom position or aperture diameter. At this time, the selected image recovery filter may be corrected as necessary. This is in order to reduce the quantity of data of the image recovery filter prepared in advance in a storage unit 107. The storage unit 107 stores data of image recovery filters corresponding to discrete capture conditions, and when this data is used in the image recovery process, the data of the selected filter is corrected to data that corresponds to the actual capture conditions. Also, a configuration may be adopted in which an image recovery filter is not selected, but rather, an image recovery filter is generated according to the capture state from information related to an OTF necessary for generating an image recovery filter. Next, in step S204, using the image recovery filter that was selected in step S203, the image recovery processing unit 110 performs convolution processing on each pixel of each color component of the image that was captured. With this processing, it is possible to eliminate or reduce asymmetric correction of aberration or the blur component of the image generated in the imaging optical system. Note that here, an example was described in which convolution processing using an image recovery filter is performed after performing pixel interpolation processing, but a configuration may also be adopted in which pixel interpolation processing is performed after performing convolution processing using an image recovery filter.

Next, in step S205, the development/compression processing unit 113 performs gamma correction. The image on which gamma correction is performed is the image to which image recovery was applied in a case where the image recovery application setting was set to ON. On the other hand, the image on which gamma correction is performed is an image to which image recovery was not applied in a case where the image recovery application setting was set to OFF. The development/compression processing unit 113 performs gamma correction according to the characteristics of the image sensor 102.

In subsequent steps S206 through S209, the edge emphasis parameter determination unit 111 determines edge emphasis parameters, and the edge emphasis unit 112 performs edge emphasis processing, but first principles of the edge emphasis processing in the present embodiment will be described.

Figure 3B:
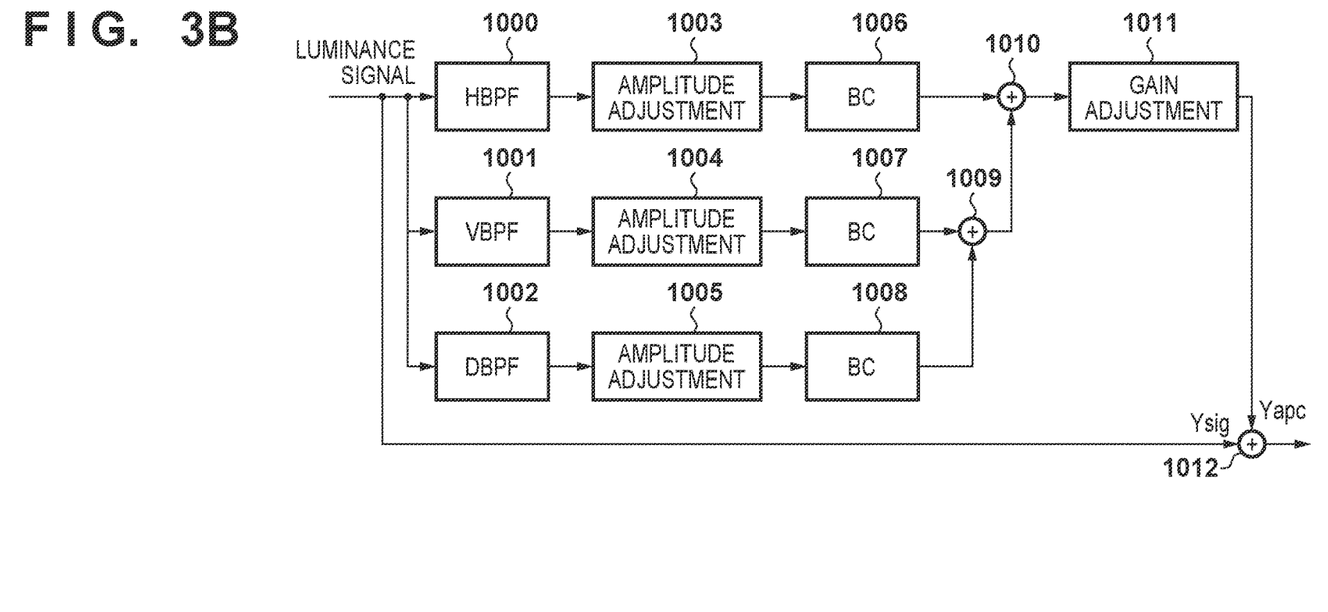
FIG. 3B illustrates edge emphasis processing according to an embodiment of the invention.

FIG. 3B shows a flow of common edge emphasis processing performed by the edge emphasis unit 112. It is also possible to refer to FIG. 3B as a function block diagram that shows an exemplary configuration of the edge emphasis unit 112. In this case, each processing shown in FIG. 3B is interpreted to represent a processing block that executes the processing of the edge emphasis unit 112.

Figure 4A:
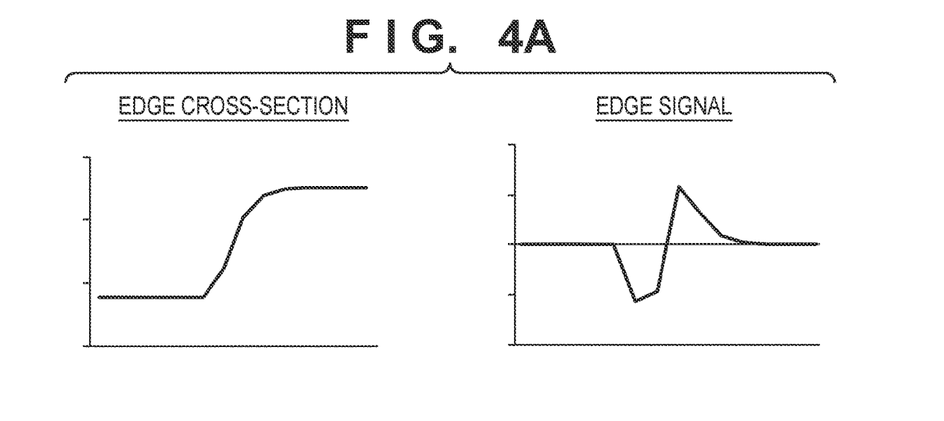
FIGS. 4A to 4D illustrate an example of edge emphasis processing according to a first embodiment of the invention.

A luminance signal is input to the edge emphasis unit 112, and is supplied to each of bandpass filter processing 1000 to 1002. Note that among the RGB plane signals, the G plane signal can be used for the luminance signal. The bandpass filter processing 1000, which detects a high-frequency component in the horizontal direction (HBPF), detects an edge in the horizontal direction from the luminance signal that was input, and outputs the detected edge as an edge signal. In FIG. 4A, the left side shows a cross-section of luminance values of the edge area included in the image subject to processing, and the right side shows an example of the edge signal that was detected from that edge area. An amplitude adjustment processing 1003 performs amplitude adjustment on the edge signal that was obtained in this way, and a noise component is removed by a BC (base clip) processing 1006. The BC processing 1006 removes the noise component by removing a signal that has an amplitude of a base clip level or less from the signal subject to processing.

Edge signals are likewise detected in the vertical direction (VBPF) and the diagonal direction (DBPF). The respective edge signals are added with adders 1009 and 1010, and gain is adjusted with a gain adjustment processing 1011, to obtain Yapc. Lastly, a main luminance signal (Ysig) and the edge signal (Yapc) after gain adjustment that was output from the gain adjustment processing 1011 are added using an adder 1012, and the result is output as a luminance signal with edge emphasis processing complete.

Figure 4B:
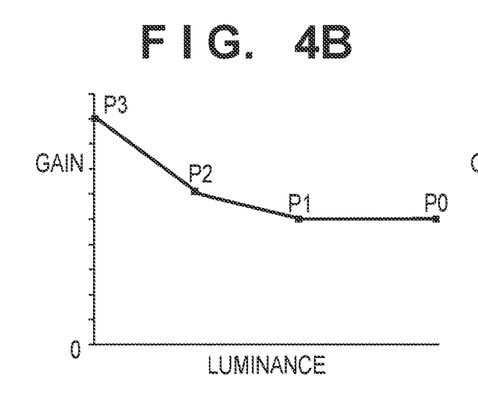

The edge emphasis parameters applied in the gain adjustment processing 1011 are adjustment values for adjusting the degree of emphasis of edges included in the image subject to processing, and can include different gain adjustment values according to luminance values. An example of these different gain adjustment values according to luminance values is shown in FIG. 4B. In this example, the edge emphasis parameters include gain adjustment values P0 to P3, and between each gain adjustment value, gain adjustment values are set for each luminance using linear interpolation. In the present embodiment, gain adjustment values are set such that gain is increased as the luminance value decreases. For convenience, in the description of the present embodiment, the area between luminance values where P0 and P1 are set is used as the range of luminance values on the high-luminance side, and the area between luminance values where P1, P2, and P3 are set is used as the range of luminance values on the low-luminance side. However, in FIG. 4B, the edge emphasis parameters include four gain adjustment values, but a greater number or a fewer number of gain adjustment values may be included. Thus, it is possible to change the range of high luminance and the range of low luminance according to the quantity of gain adjustment values that is set, or according to the values.

Here, returning to FIG. 2, after the gamma correction in step S205, the edge emphasis parameter determination unit 111 determines the edge emphasis parameters. In step S206, the edge emphasis parameter determination unit 111 determines the image recovery setting, and obtains edge emphasis parameters according to the set value. Specifically, when the image recovery setting is OFF, ('NO' in step S206), in step S207, the edge emphasis parameter determination unit 111 obtains a first parameter, and when the image recovery setting is ON, ('YES' in step S206), in step S208, the edge emphasis parameter determination unit 111 obtains a second parameter. Using the parameters obtained in this way, in step S209, the edge emphasis unit 112 performs edge emphasis processing. Afterward, in step S210, the development/compression processing unit 113 executes unprocessed development processing such as color balance adjustment.

Figure 4C:
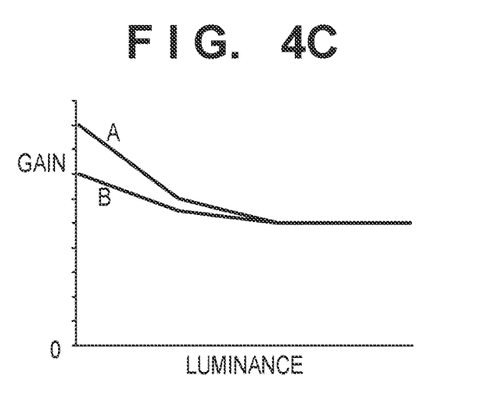

Here, an example of edge emphasis parameters in the present embodiment is shown in FIG. 4C. The value indicated by A in FIG. 4C is the first parameter, and the value indicated by B is the second parameter. Each parameter is defined as a collection of a plurality of gain adjustment values as shown in FIG. 4B. The edge emphasis parameter determination unit 111 obtains the parameters from the storage unit 107 according to the ON/OFF setting of the image recovery setting. In the first parameter, the gain adjustment value is set so as to raise gain more on the low-luminance side than on the high-luminance side, and on the other hand, in the second parameter, the degree of gain increase is smaller on the low-luminance side than for the first parameter. That is, the second parameter suppresses the gain adjustment value on the low-luminance side compared to the first parameter.

A parameter that suppresses the gain adjustment values on the low-luminance side can be calculated as indicated in the below expressions. Note that in the storage unit 107, the second parameter calculated based on the below expressions can be stored in advance along with the first parameter. Also, a configuration may be adopted in which the storage unit 107 stores only the first parameter, and the edge emphasis parameter determination unit 111 calculates the second parameter from the first parameter based on below (Exp. 6) to (Exp. 9). Here, P0' to P3' are parameters that correspond to P0 to P3 when the gain adjustment values on the low-luminance side were suppressed, and K indicates a suppression coefficient. The suppression coefficient K is a value obtained in advance through experimentation at which, for an image on which image recovery was performed, emphasis of over-correction is suppressed, and also perceived resolution is not impaired. In (Exp. 6) to (Exp. 9), the suppression coefficient K is multiplied by the difference between P0 and P1 to P3, and then this result is added to P0. Thus, it is possible to determine a range where the degree of emphasis is not changed by setting a value that matches P0. Said another way, by setting a gain adjustment value of a value that differs from P0, it is possible to determine a range on the low-luminance side where the degree of emphasis is changed.

$$P0'=P0 \quad \text{(Exp. 6)}$$

$$P1'=K(P1-P0)+P0 \quad \text{(Exp. 7)}$$

$$P2'=K(P2-P0)+P0 \quad \text{(Exp. 8)}$$

$$P3'=K(P3-P0)+P0 \quad \text{(Exp. 9)}$$

Figure 4D:
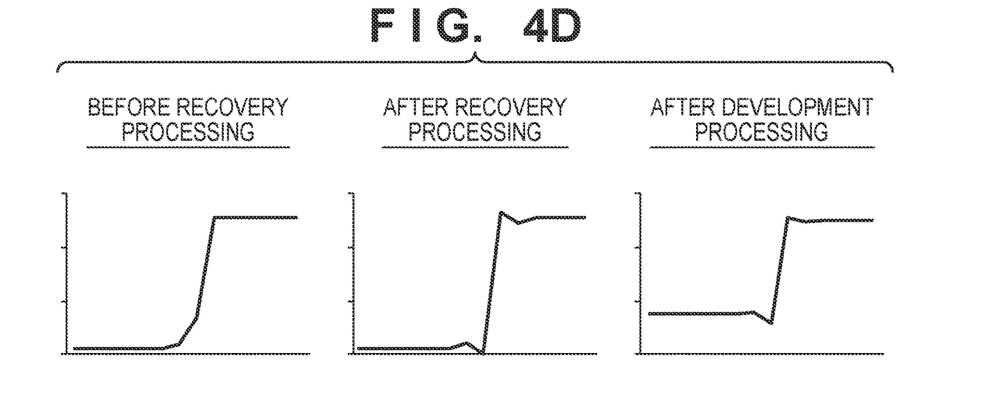

FIG. 4D shows an example of edge cross-sections in a case where image processing of the present embodiment was performed. In this example, saturation has occurred, but even when over-correction has occurred in image recovery processing, emphasis of the over-corrected portion by edge emphasis processing is suppressed, and it is clear that the effect of over-correction is reduced compared to the example shown in FIG. 8C.

Thus, according to the present embodiment, it is possible to perform edge emphasis processing in which the intensity of edge emphasis is switched according to whether or not image recovery is applied, and over-correction of a low-luminance side that is easily apparent is not emphasized in image recovery.

Second Embodiment

Below, a second embodiment of the invention will be described. The basic configuration of the image processing apparatus 100 according to the second embodiment, and the processing flow in the image processing unit 104, are the same as in FIGS. 1 and 2 described in the first embodiment, so a description thereof is omitted here.

In the present embodiment, a case is described where an edge emphasis parameter (the second parameter) when performing image recovery is changed based on the cause of over-correction in image recovery. One cause of over-correction, as described above, is loss of subject information due to pixel saturation. As the number of saturated pixels in the image area used when performing convolution of the image recovery filter increases, there is an increasing likelihood that recovery processing cannot be performed correctly, resulting in over-correction. Accordingly, when performing image recovery processing for a certain pixel of interest, the ratio of saturated pixels within the image area subject to processing of the image recovery filter is calculated. The ratio of saturated pixels can be calculated when the image recovery processing unit 110 executes the image recovery processing. By determining the edge emphasis parameters when adding an edge signal to that pixel of interest according to this ratio, it is possible to suppress the intensity of edge emphasis at locations where over-correction easily occurs in image recovery.

Figure 5A:
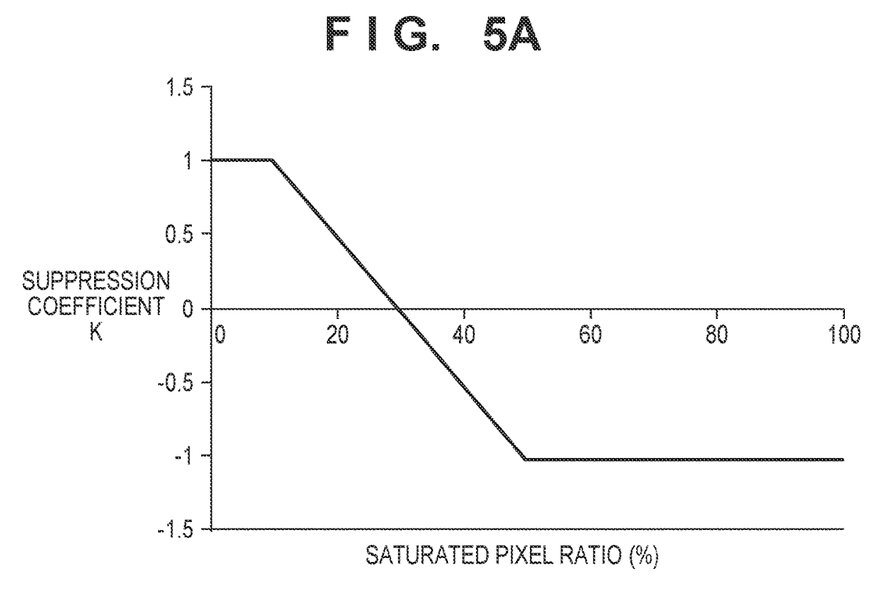
FIGS. 5A and 5B illustrate an example of edge emphasis processing according to a second embodiment of the invention.
Figure 5B:
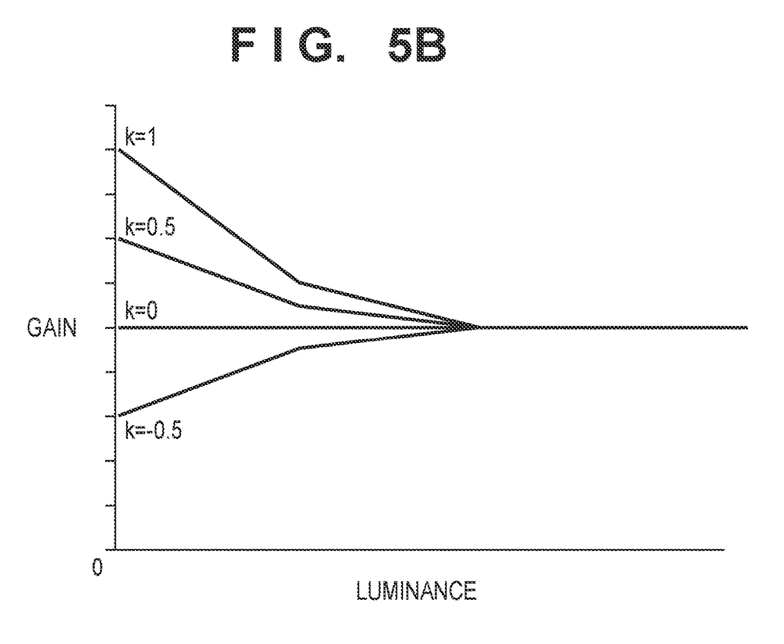

In this case, the edge emphasis parameter determination unit 111 can perform calculation based on parameters obtained from the storage unit 107, and determine edge emphasis parameters according to the ratio of saturated pixels. FIG. 5A shows an example of suppression coefficients K according to the ratio of pixels. Specifically, when the ratio of saturated pixels is small (0 to 10%), the degree of emphasis of the low-luminance side is not suppressed (K=1). In a range where the ratio of saturated pixels is 10 to 50%, the suppression coefficient K is reduced inversely proportional to the increase in the ratio, and so the degree of emphasis of the low-luminance side is suppressed according to the increase in the ratio of saturated pixels. Afterward, when the ratio of saturated pixels is 50% or more, K is constant at −1. By setting K to a negative value, it is possible to prevent ringing that occurred in the vicinity of a high-luminance portion due to image recovery from becoming apparent. Note that this embodiment is only an example, and the range where K=1 may be expanded or narrowed. Also, the range where the suppression coefficient K is caused to change may be expanded or narrowed. Also, the range where K=−1 may be expanded or narrowed. An example of gain adjustment values changing according to the luminance, calculated in (Exp. 6) to (Exp. 9) using this suppression coefficient, is shown in FIG. 5B. Here, suppression of gain adjustment on the low-luminance side is strengthened as the ratio occupied by saturated pixels increases. Also, according to the increase in the ratio occupied by saturated pixels, the gain adjustment values change from a setting where the degree of emphasis of the low-luminance side is stronger than the degree of emphasis of the high-luminance side, to a setting where the degree of emphasis of the low-luminance side is weaker than the degree of emphasis of the high-luminance side.

Thus, according to the present embodiment, it is possible to perform edge emphasis processing in which the intensity of edge emphasis is switched according to characteristics of the pixel area subject to image recovery processing, particularly according to the ratio of saturated pixels, and over-correction of a low-luminance side that is easily apparent is not emphasized in image recovery.

Third Embodiment

Below, a third embodiment of the invention will be described. The basic configuration of the image processing apparatus 100 according to the third embodiment, and the processing flow in the image processing unit 104, are the same as in FIGS. 1 and 2 described in the first embodiment, so a description thereof is omitted here.

Figure 6A:
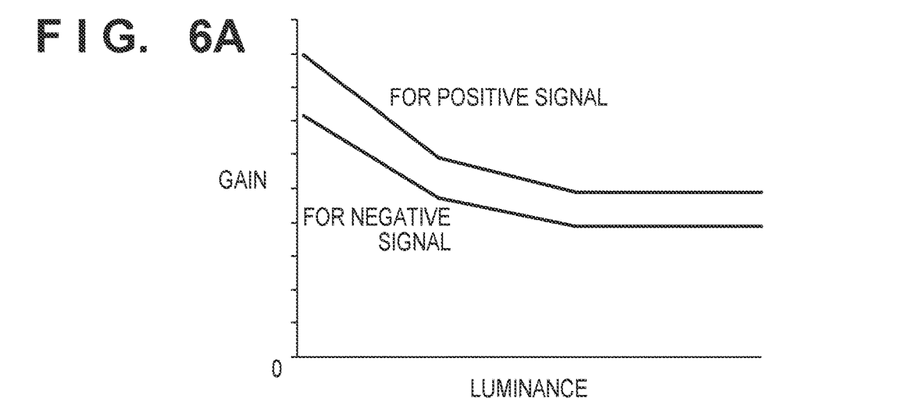
FIGS. 6A to 6C illustrate an example of edge emphasis processing according to a third embodiment of the invention.

In the third embodiment, a description is given of another pattern of gain adjustment values according to luminance obtained as the second parameter for edge emphasis when applying image recovery processing. As previously stated, an edge signal is input in the gain adjustment processing 1011 of the edge emphasis unit 112 shown in FIG. 3B. This edge signal includes a positive signal and a negative signal as shown on the right side in FIG. 4A. In the present embodiment, as shown in FIG. 6A, gain adjustment values according to luminance are respectively set for the positive edge signal and the negative edge signal. In the example in FIG. 6A, gain adjustment values according to luminance when applying image recovery are shown, and gain adjustment values for the negative edge signal have a smaller value than gain adjustment values for the positive edge signal. That is, gain adjustment values are suppressed for the negative edge signal. At this time, gain adjustment values for the positive edge signal may be the same as gain adjustment values in a case where image recovery is not applied.

The parameters of gain adjustment values for the negative edge signal can be calculated in advance from below (Exp. 10) to (Exp. 13). Here, P0' to P3' are parameters that correspond to P0 to P3 in FIG. 4B when the gain adjustment values on the low-luminance side were suppressed, and K indicates a suppression coefficient. In (Exp. 10) to (Exp. 13), gain adjustment values are calculated by multiplying the suppression coefficient K by each of the values P0 to P3. Thus, unlike in the case of (Exp. 6) to (Exp. 9), selective suppression of only the low-luminance side is not performed, rather, suppression is performed in the entire range of luminance, and as a result the low-luminance side is also suppressed.

$$P0'=K \times P0 \quad \text{(Exp. 10)}$$

$$P1'=K \times P1 \quad \text{(Exp. 11)}$$

$$P2'=K \times P2 \quad \text{(Exp. 12)}$$

$$P3'=K \times P3 \quad \text{(Exp. 13)}$$

Figure 6B:
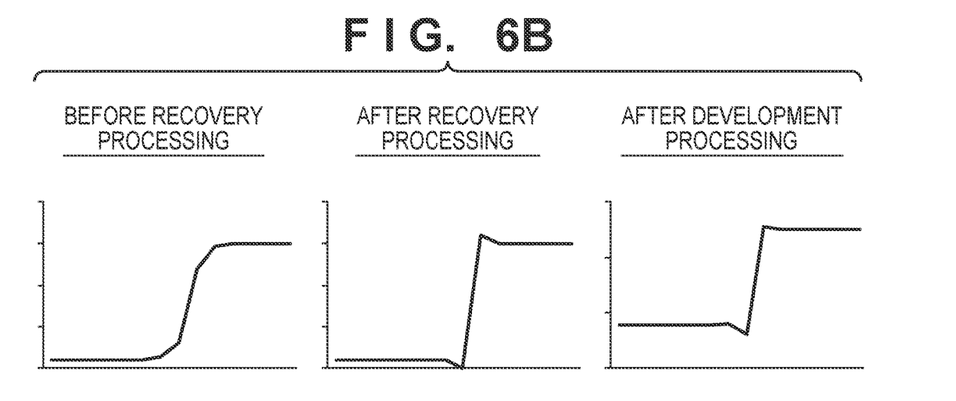

FIG. 6B shows an example in which these gain adjustment values according to luminance are used in a case where over-correction in image recovery occurs due to lens manufacturing differences. In this example, over-correction has occurred in image recovery processing, but emphasis of the over-corrected portion by edge emphasis processing is suppressed, and it is clear that the effect of over-correction is reduced compared to the example shown in FIG. 8D. Thus, when image recovery is applied, by reducing the gain adjustment values according to luminance for the negative edge signal, it is possible to perform edge emphasis processing in which emphasis of over-correction of a low-luminance side that is easily apparent in image recovery is suppressed. Also, by not suppressing the gain adjustment values for the positive edge signal on the low-luminance side, it is possible to adjust the perceived resolution of a low-luminance portion in an area where over-correction has not occurred.

Figure 6C:
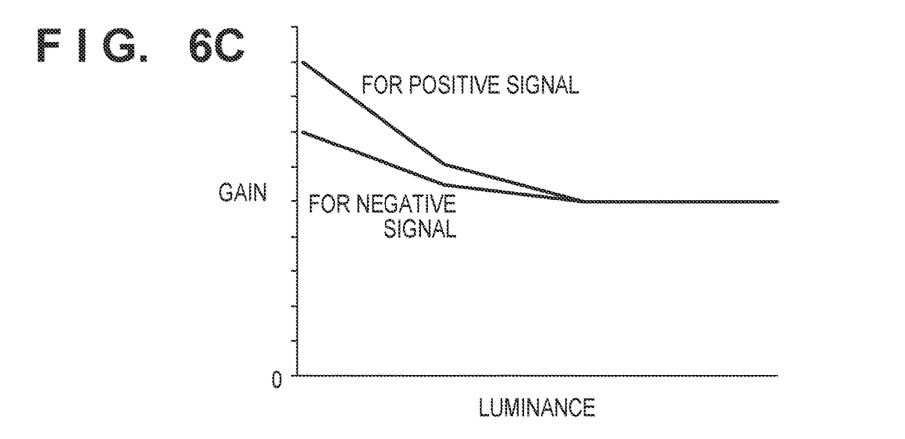

Above, the gain adjustment values according to luminance for the negative edge signal are set using (Exp. 10) to (Exp. 13), but parameters utilizing (Exp. 6) to (Exp. 9) can also be used for the gain adjustment values according to luminance for the negative edge signal. In this case, as shown in FIG. 6C, for the gain adjustment values of the negative edge signal, it is possible to set the gain adjustment values P0' and P1' of the high-luminance side to be the same as the gain adjustment values for the positive edge signal, and to set the gain adjustment values P2' and P3' of the low-luminance side to be smaller values. That is, it is possible to suppress only the degree of emphasis on the low-luminance side.

The edge emphasis parameters when performing image recovery can be changed according to how easily over-correction appears in image recovery. Over-correction is more easily apparent when there is higher edge contrast. This means that there is a greater tendency for over-correction to be apparent when there is a greater difference between dark and light within the image area subject to processing when performing convolution of the image recovery filter. Accordingly, when performing image recovery processing on a pixel of interest, in the image area subject to image recovery filter processing, a difference value between a maximum pixel value (maximum luminance value) or a minimum pixel value (minimum luminance value) and a pixel value (luminance value) of the pixel of interest is calculated, and the larger of these is adopted as an absolute value. By determining the edge emphasis parameters of the pixel of interest according to these difference values, it is possible to reduce the intensity of edge emphasis at locations where over-correction easily occurs in image recovery. In this case, the edge emphasis parameter determination unit 111 performs calculation based on the parameters obtained from the storage unit 107.

Figure 7A:
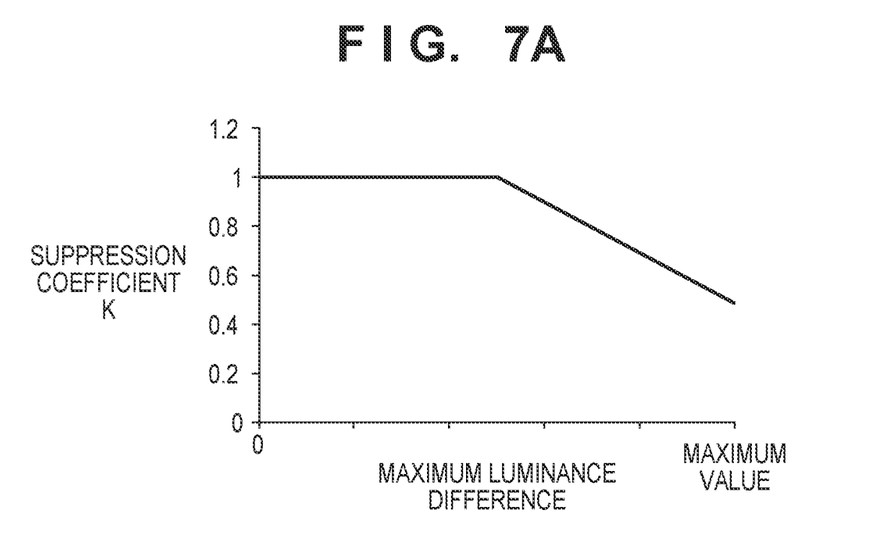
FIGS. 7A and 7B illustrate another example of edge emphasis processing according to a third embodiment of the invention.
Figure 7B:
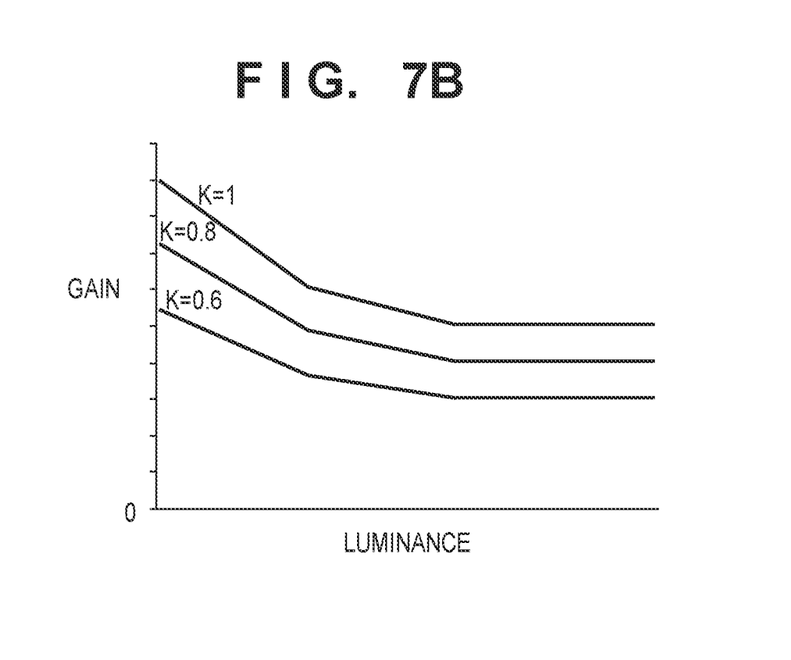

FIG. 7A shows example suppression coefficients K according to the maximum luminance difference. In FIG. 7A, the value of the suppression coefficient K becomes smaller as the maximum luminance difference increases. FIG. 7B shows example gain adjustment values according to luminance, calculated in (Exp. 10) to (Exp. 13) using this suppression coefficient K. Because the value of the suppression coefficient K becomes smaller as the maximum luminance difference increases, suppression of gain adjustment on the low-luminance side increases.

Further, the suppression coefficients K shown in FIG. 7A can also be applied in (Exp. 6) to (Exp. 9). The gain adjustment values on the low-luminance side are suppressed according to the maximum luminance difference within the image area used in image recovery filter convolution. Thus, in this case P0' and P1' on the high-luminance side have the same value regardless of the maximum luminance difference, and the gain adjustment values of P2' and P3' on the low-luminance side decrease as the maximum luminance value increases. Also, (Exp. 10) to (Exp. 13) may be applied instead of (Exp. 6) to (Exp. 9) when determining the edge emphasis parameters of the first and second embodiments.

In this case, the gain adjustment values are less as a whole for P0' to P3' for the second parameter than for P0 to P3 for the first parameter.

Thus, according to the present embodiment, it is possible to perform edge emphasis processing in which the intensity of edge emphasis is switched according to the sign of an edge signal, or according to the maximum luminance difference in the pixel area subject to image recovery processing, and over-correction of a low-luminance side that is easily apparent is not emphasized in image recovery.

As described in the above embodiments, there are a plurality of contributions of gain adjustment values according to luminance, and when performing image recovery processing, by using gain adjustment values according to the result of that processing, it is possible to perform edge emphasis processing in which emphasis of over-correction due to image recovery is suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-064900, filed Mar. 26, 2015 which is hereby incorporated by reference herein in its entirety.

What is claimed is:

1. An image processing apparatus, comprising:
    at least one non-transitory memory device;
    at least one processor,
    a recovery processing unit configured to, for an image subject to processing, perform filter processing of correcting aberration of an imaging optical system used when generating the image and recovering image quality degradation; and
    an edge emphasis unit configured to perform edge emphasis processing by detecting an edge signal having a predetermined frequency component from the image subject to processing, adjusting intensity of the detected edge signal, and adding the edge signal after adjustment to the image subject to processing,
    wherein the edge emphasis unit is further configured to:
        make a degree of emphasis of the edge signal smaller in a case where the filter processing is performed than in a case where the filter processing is not performed, by making a rain adjustment value, to be applied to the edge signal corresponding to a pixel whose luminance value is equal to or less than a predetermined value, have a smaller value in a case where the filter processing is performed than in a case where the filter processing is not performed, and
        make the degree of emphasis of the edge signal equal for both the case where the filter processing is performed and the case where the filter processing is not performed, by making the gain adjustment value, to be applied to the edge signal corresponding to a pixel whose luminance value is larger than the predetermined value, have an equal value for both the case where the filter processing is performed and the case where the filter processing is not performed,
    wherein the recovery processing unit and the edge emphasis unit are implemented by the at least one processor executing at least one program recorded on the at least one non-transitory memory device.

2. The image processing apparatus according to claim 1, wherein the edge emphasis unit is further configured to adjust the intensity of the edge signal based on luminance of each pixel of the image to which the edge signal after adjustment is to be added.

3. The image processing apparatus according to claim 2, wherein the edge emphasis unit is further configured to adjust the intensity of the edge signal such that the degree of emphasis of the edge signal becomes larger for a pixel having a luminance value smaller than a threshold than for a pixel having a luminance value not less than the threshold.

4. The image processing apparatus according to claim 1, wherein the edge emphasis unit is further configured to adjust the intensity of the edge signal such that the degree of emphasis is suppressed more for a negative component within the edge signal than for a positive component within the edge signal, when the filter processing has been performed on the image from which the edge signal is detected.

5. The image processing apparatus according to claim 4, wherein the edge emphasis unit is further configured to adjust the intensity of the edge signal such that when the filter processing has not been performed, the degree of emphasis of the edge signal becomes equal for pixels having respective luminance values greater than a predetermined luminance value, regardless of whether the edge signal has the positive component or the negative component.

6. The image processing apparatus according to claim 1, wherein the edge emphasis unit is further configured to adjust the intensity of the edge signal based on a luminance difference within the area subject to the filter processing, when the filter processing has been performed on the image from which the edge signal is detected.

7. The image processing apparatus according to claim 6, wherein the edge emphasis unit is further configured to adjust the intensity of the edge signal such that the degree of emphasis is suppressed as a difference increases between a luminance value of a pixel of interest within the area subject to the filter processing and a maximum or minimum luminance value of a pixel within the area subject to the filter processing.

8. The image processing apparatus according to claim 1, wherein the gain adjustment value to be applied to the edge signal corresponding to the pixel whose luminance value is equal to or less than the predetermined value in a case where the filter processing is performed, is calculated based on the gain adjustment value to be applied in a case where the filter processing is not performed and a suppression coefficient.

9. An image capturing apparatus, comprising:
an image sensor configured to capture a subject, and generate the image subject to processing; and
an image processing apparatus comprising:
  at least one non-transitory memory device;
  at least one processor,
  a recovery processing unit configured to, for an image subject to processing, perform filter processing of correcting aberration of an imaging optical system used when generating the image and recovering image quality degradation; and
  an edge emphasis unit configured to perform edge emphasis processing by detecting an edge signal having a predetermined frequency component from the image subject to processing, adjusting intensity of the detected edge signal, and adding the edge signal after adjustment to the image subject to processing,
  wherein the edge emphasis unit is further configured to:
  make a degree of emphasis of the edge signal smaller in a case where the filter processing is performed than in a case where the filter processing is not performed, by making a gain adjustment value, to be applied to the edge signal corresponding to a pixel whose luminance value is equal to or less than a predetermined value, have a smaller value in a case where the filter processing is performed than in a case where the filter processing is not performed, and
  make the degree of emphasis of the edge signal equal for both the case where the filter processing is performed and the case where the filter processing is not performed, by making the gain adjustment value, to be applied to the edge signal corresponding to a pixel whose luminance value is larger than the predetermined value, have an equal value for both the case where the filter processing is performed and the case where the filter processing is not performed,
  wherein the recovery processing unit and the edge emphasis unit are implemented by the at least one processor executing at least one program recorded on the at least one non-transitory memory device.

10. An image processing method, comprising:
performing filter processing of, for an image subject to processing, correcting aberration of an imaging optical system used when generating the image and recovering image quality degradation; and
performing edge emphasis processing by detecting an edge signal having a predetermined frequency component from the image subject to processing, adjusting intensity of the detected edge signal, and adding the edge signal after adjustment to the image subject to processing,
wherein in the edge emphasis processing,
  a degree of emphasis of the edge signal is made smaller in a case where the filter processing is performed than in a case where the filter processing is not performed, by making a gain adjustment value, to be applied to the edge signal corresponding to a pixel whose luminance value is equal to or less than a predetermined value, have a smaller value in a case where the filter processing is performed than in a case where the filter processing is not performed, and
  the degree of emphasis of the edge signal is made equal for both the case where the filter processing is performed and the case where the filter processing is not performed, by making the gain adjustment value, to be applied to the edge signal corresponding to a pixel whose luminance value is larger than the predetermined value, have an equal value for both the case where the filter processing is performed and the ease where the filter processing is not performed.

11. A non-transitory computer-readable storage medium on which is stored a program causing an image processing apparatus to perform operations of:
performing filter processing of, for an image subject to processing, correcting aberration of an imaging optical system used when generating the image and recovering image quality degradation; and
performing edge emphasis processing by detecting an edge signal having a predetermined frequency component from the image subject to processing, adjusting intensity of the detected edge signal, and adding the edge signal after adjustment to the image subject to processing,
wherein in the edge emphasis processing,
  a degree of emphasis of the edge signal is made smaller in a case where the filter processing is performed than in a ease where the filter processing is not performed, by making a gain adjustment value, to be applied to the edge signal corresponding to a pixel whose luminance value is equal to or less than a predetermined value, have a smaller value in a case where the filter processing is performed than in a case where the filter processing is not performed, and
  the degree of emphasis of the edge signal is made equal for both the case where the filter processing is performed and the case where the filter processing is not performed, by making the gain adjustment value, to be applied to the edge signal corresponding to a pixel whose luminance value is larger than the predetermined value, have an equal value for both the case where the filter processing is performed and the case where the filter processing is not performed.

12. An image processing apparatus, comprising:
at least one non-transitory memory device;
at least one processor;
a recovery processing unit configured to, for an image subject to processing, perform filter processing for correcting aberration of an imaging optical system used when generating the image and recovering image quality degradation; and
an edge emphasis unit configured to perform edge emphasis processing by detecting an edge signal having a predetermined frequency component from the image subject to processing, adjusting intensity of the detected edge signal, and adding the edge signal after adjustment to the image subject to processing, wherein the edge emphasis unit adjusts the intensity of the edge signal based on a ratio occupied by saturated pixels within an area subject to filter processing, wherein the edge emphasis unit is further configured to adjust the intensity of the edge signal such that the degree of emphasis of the edge signal is suppressed as the ratio occupied by saturated pixels within the area subject to the filter processing increases, wherein the edge emphasis unit is further configured to:
adjust the intensity of the edge signal based on a luminance value of each pixel of the image to which the edge signal after adjustment is added,
adjust the intensity of the edge signal such that the degree of the emphasis of the edge signal at pixels on a low luminance side becomes greater than the degree of the emphasis of the edge signal at pixels on a high luminance side, when the ratio occupied by saturated pixels within the area subject to the filter processing is smaller than a threshold value, and
adjust the intensity of the edge signal such that the degree of the emphasis of the edge signal at pixels on the low luminance side becomes not greater than the degree of the emphasis of the edge signal at pixels on the high luminance side, when the ratio occupied by saturated pixels within the area subject to the filter processing is not smaller than the threshold value, wherein the recovery processing unit and the edge emphasis unit are implemented by the at least one processor executing at least one program recorded on the at least one non-transitory memory device.

13. An image capturing apparatus, comprising:
an image sensor configured to capture a subject, and generate the image subject to processing; and
an image processing apparatus comprising:
at least one non-transitory memory device;
at least one processor;
a recovery processing unit configured to, for an image subject to processing, perform filter processing for correcting aberration of an imaging optical system used when generating the image and recovering image quality degradation; and
an edge emphasis unit configured to perform edge emphasis processing by detecting an edge signal having a predetermined frequency component from the image subject to processing, adjusting intensity of the detected edge signal, and adding the edge signal after adjustment to the image subject to processing,
wherein the edge emphasis unit adjusts the intensity of the edge signal based on a ratio occupied by saturated pixels within an area subject to the filter processing,
wherein the edge emphasis unit is further configured to adjust the intensity of the edge signal such that the degree of emphasis of the edge signal is suppressed as the ratio occupied by saturated pixels within the area subject to the filter processing increases,
wherein the edge emphasis unit is further configured to:
adjust the intensity of the edge signal based on a luminance value of each pixel of the image to which the edge signal after adjustment is added,
adjust the intensity of the edge signal such that the degree of the emphasis of the edge signal at pixels on a low luminance side becomes greater than the degree of the emphasis of the edge signal at pixels on a high luminance side, when the ratio occupied by saturated pixels within the area subject to the filter processing is smaller than a threshold value, and
adjust the intensity of the edge signal such that the degree of the emphasis of the edge signal at pixels on the low luminance side becomes not greater than the degree of the emphasis of the edge signal at pixels on the high luminance side, when the ratio occupied by saturated pixels within the area subject to the filter processing is not smaller than the threshold value,
wherein the recovery processing unit and the edge emphasis unit are implemented by the at least one processor executing at least one program recorded on the at least one non-transitory memory device.

14. An image processing method, comprising:
performing filter processing of, for an image subject to processing, correcting aberration of an imaging optical system used when generating the image and recovering image quality degradation; and
performing edge emphasis processing by detecting an edge signal having a predetermined frequency component from the image subject to processing, adjusting intensity of the detected edge signal, and adding the edge signal after adjustment to the image subject to processing,
wherein in the edge emphasis processing, the intensity of the edge signal is adjusted based on a ratio occupied by saturated pixels within an area subject to the filter processing,
wherein in the edge emphasis processing, the intensity of the edge signal is adjusted such that the degree of emphasis of the edge signal is suppressed as the ratio occupied by saturated pixels within the area subject to the filter processing increases,
wherein in the edge emphasis processing,
the intensity of the edge signal is adjusted based on a luminance value of each pixel of the image to which the edge signal after adjustment is added,
the intensity of the edge signal is adjusted such that the degree of the emphasis of the edge signal at pixels on a low luminance side becomes greater than the degree of the emphasis of the edge signal at pixels on a high luminance side, when the ratio occupied by saturated pixels within the area subject to the filter processing is smaller than a threshold value, and
the intensity of the edge signal is adjusted such that the degree of the emphasis of the edge signal at pixels on the low luminance side becomes not greater than the degree of the emphasis of the edge signal at pixels on the high luminance side, when the ratio occupied by saturated pixels within the area subject to the filter processing is not smaller than the threshold value.

15. A non-transitory computer-readable storage medium on which is stored a program causing an image processing apparatus to perform operations of:
performing filter processing of, for an image subject to processing, correcting aberration of an imaging optical system used when generating the image and recovering image quality degradation; and
performing edge emphasis processing by detecting an edge signal having a predetermined frequency component from the image subject to processing, adjusting intensity of the detected edge signal, and adding the edge signal after adjustment to the image subject to processing, wherein in the edge emphasis processing, the intensity of the edge signal is adjusted based on a ratio occupied by saturated pixels within an area subject to the filter processing, wherein in the edge emphasis processing, the intensity of the edge signal is adjusted such that the degree of emphasis of the edge signal is suppressed as the ratio occupied by saturated pixels within the area subject to the filter processing increases, wherein in the edge emphasis processing,
- the intensity of the edge signal is adjusted based on a luminance value of each pixel of the image to which the edge signal after adjustment is added,
- the intensity of the edge signal is adjusted such that the degree of the emphasis of the edge signal at pixels on a low luminance side becomes greater than the degree of the emphasis of the edge signal at pixels on a high luminance side, when the ratio occupied by saturated pixels within the area subject to the filter processing is smaller than a threshold value, and
- the intensity of the edge signal is adjusted such that the degree of the emphasis of the edge signal at pixels on the low luminance side becomes not greater than the degree of the emphasis of the edge signal at pixels on the high luminance side, when the ratio occupied by saturated pixels within the area subject to the filter processing is not smaller than the threshold value.

* * * * *